United States Patent
Smithson (10) Patent No.: US 9,225,703 B2
(45) Date of Patent: Dec. 29, 2015

(54) PROTECTING END POINT DEVICES

(71) Applicant: Brian Smithson, Sunnyvale, CA (US)

(72) Inventor: Brian Smithson, Sunnyvale, CA (US)

(73) Assignee: Richo Company, Ltd., Tokyo (JP)

(*) Notice: Subject to any disclaimer, the term of this patent is extended or adjusted under 35 U.S.C. 154(b) by 71 days.

(21) Appl. No.: 13/907,777

(22) Filed: May 31, 2013

(65) Prior Publication Data

US 2014/0359707 A1    Dec. 4, 2014

(51) Int. Cl.
*H04L 29/00*   (2006.01)
*H04L 29/06*   (2006.01)
*H04L 29/08*   (2006.01)
*G06F 21/30*   (2013.01)

(52) U.S. Cl.
CPC .............. *H04L 63/08* (2013.01); *H04L 63/04* (2013.01); *H04L 63/10* (2013.01); *G06F 21/30* (2013.01); *H04L 63/108* (2013.01); *H04L 65/1066* (2013.01); *H04L 67/14* (2013.01)

(58) Field of Classification Search
CPC ......... H04L 29/63; H04L 29/08; H04L 65/10; H04L 67/14
USPC .............. 726/1–12, 26–30; 709/217–229
See application file for complete search history.

(56) References Cited

U.S. PATENT DOCUMENTS

| 7,724,752 | B1* | 5/2010 | Shen et al. ..................... 370/401 |
| 7,739,727 | B2* | 6/2010 | Syvanne ........................... 726/11 |
| 8,429,293 | B2* | 4/2013 | Twitchell ....................... 709/238 |
| 2004/0052376 | A1* | 3/2004 | Fisher et al. .................... 380/257 |
| 2005/0278777 | A1* | 12/2005 | Loza ................................... 726/4 |
| 2007/0109982 | A1* | 5/2007 | Gudipudi et al. ........... 370/310.2 |

* cited by examiner

*Primary Examiner* — Madhuri Herzog
(74) *Attorney, Agent, or Firm* — Hickman Palermo Becker Bingham LLP; Edward A. Becker (57) ABSTRACT

An approach is provided for protecting endpoint devices against unauthorized network connections. An endpoint device to be protected initiates a security test by requesting that a security detection service attempt to establish a network connection with the endpoint device. The endpoint device receives, from the security detection service, a response to the request sent to the security detection service. The security detection service attempts to establish a connection with the endpoint device. If a new network connection is received between the security detection service and the endpoint, then one or more actions are performed to secure network communications with the endpoint device.

15 Claims, 4 Drawing Sheets

PROTECTING END POINT DEVICES

FIELD

Embodiments relate to network-enabled endpoint devices and, more particularly, to an approach for protecting network-enabled endpoint devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The increasing widespread availability of network connectivity has caused a large increase in the number of endpoint devices that are capable of communicating over networks. For example, significant numbers of printers, scanners, copiers, multi-function peripherals (MFPs), tablet computing devices, laptop computers, personal digital assistants (PDAs), telephony devices, industrial controls, HVAC controls, home appliances, entertainment devices, such as TVs, game consoles, etc., now have the ability to perform wired and wireless network communications.

One of the issues with network-enabled endpoint devices is that many of them are not designed to operate on a public network without some type of network protection provided, for example, by a firewall. For example, printers and multi-function peripherals (MFPs) are designed to be operated in a protected network environment that prevents attackers on the public Internet from making a direct connection to those devices. A protected network environment may be, for example, a private network that does not have connectivity to other networks, or a network that uses a firewall or other similar device to control access to the network from other networks. Endpoint devices that are connected to a network in an unprotected environment are exposed to attackers and this may occur in a wide variety of situations. For example, an endpoint device may be connected to a router that unknowingly does not have network security properly configured. As another example, a user may connect an endpoint device to a hotel's wired network or a coffee shop's wireless network without network security being properly configured. As yet another example, an industrial control system may be accidentally connected to a network outside of a firewall, instead of inside the firewall, or an administrator may incorrectly configure the network security settings for a firewall. Thus, there are many scenarios in which an endpoint device may be connected to a network in an unprotected manner, exposing the endpoint device to attackers.

SUMMARY

An approach for protecting endpoint devices includes an endpoint device transmitting to a security detection service, over one or more communications networks, a request for the security detection service to attempt to establish a network connection with the endpoint device. The endpoint device receives, from the security detection service over the one or more communications networks, a response to the request for the security detection service to attempt to establish a network connection with the endpoint device. The endpoint device determines whether a new network connection has been received between the security detection service and the endpoint device. In response to the endpoint device determining that a new network connection has been received between the security detection service and the endpoint device, then one or more actions are performed to secure network communications with the endpoint device. The approach may be implemented by instructions stored on one or more computer-readable media, by one or more devices, or by one or more computer-implemented methods.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. PROTECTING ENDPOINT DEVICES AGAINST UNAUTHORIZED NETWORK CONNECTIONS
IV. OTHER SECURITY ISSUES
V. IMPLEMENTATION MECHANISMS

I. Overview

An approach is provided for protecting endpoint devices against unauthorized network connections. An endpoint device to be protected initiates a security test by requesting that a security detection service attempt to establish a network connection with the endpoint device. The endpoint device receives, from the security detection service, a response to the request sent to the security detection service. The security detection service attempts to establish a new network connection with the endpoint device. If a new network connection is received between the security detection service and the endpoint device, then one or more actions are performed to secure network communications with the endpoint device. This approach allows endpoint devices to determine whether they susceptible to network attacks.

II. System Architecture

Figure 1:
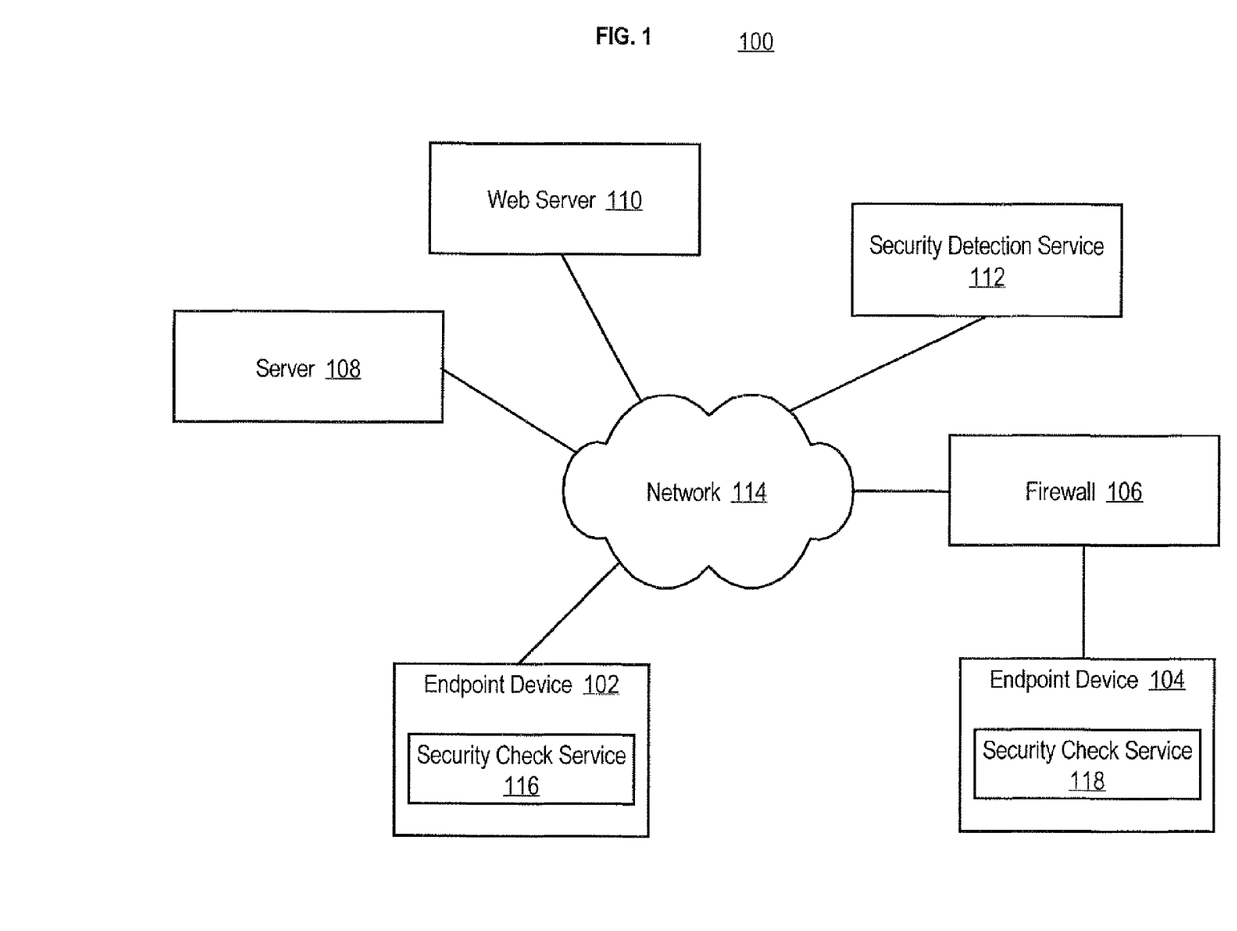
FIG. 1 is a block diagram that depicts an arrangement for protecting endpoint devices against unauthorized network connections.

FIG. 1 is a block diagram that depicts an arrangement 100 for protecting endpoint devices against unauthorized network connections. Arrangement 100 includes endpoint devices 102, 104, a firewall 106, a server 108, a Web server 110 and a security detection service 112 that communicate via a network 114. Endpoint devices 102, 104 may be any type of endpoint device, depending upon a particular implementation. Example endpoint devices include, without limitation, printers, scanners, copiers, multi-function peripherals (MFPs), tablet computing devices, laptop computers, personal digital assistants (PDAs) and telephony devices. Endpoint device 104 communicates over network 114 via firewall 106 that may be configured to provide secure network communications. Server 108 may be any type of a server, such as a file server, that provides information in response to requests. Web server 110 may be any type of Web server that provides Web pages in response to requests. Network 114 may be any number and type of networks including, without limitation, one or more wired or wireless networks, for example, one or more local area networks (LANs), wide area networks (WANs) or other networks, and the Internet. Communications between the elements depicted in FIG. 1 may be made using secure communications and the elements depicted in FIG. 1 may also have direct communications links. Arrangement 100 may include additional elements, depending upon a particular implementation, that are not depicted in FIG. 1 for purposes of explanation. As described in more detail hereinafter, security detection service 112 operates in conjunction with security check services 116, 118 to protect endpoint devices 102, 104 against unauthorized network connections. Security check services 116, 118 and security detection service 112 may be implemented by computer hardware, computer software, or any combination of computer hardware and computer software. Security detection service 112 is depicted in FIG. 1 as a separate entity for purposes of explanation only and may be implemented on a stand-alone device, or on other network elements, such as server 108, Web server 110, etc. Example implementations of security check services 116, 118 include, without limitation, one or more software applications, agents and system services on endpoint devices 102, 104.

III. Protecting Endpoint Devices Against Unauthorized Network Connections

Figure 2:
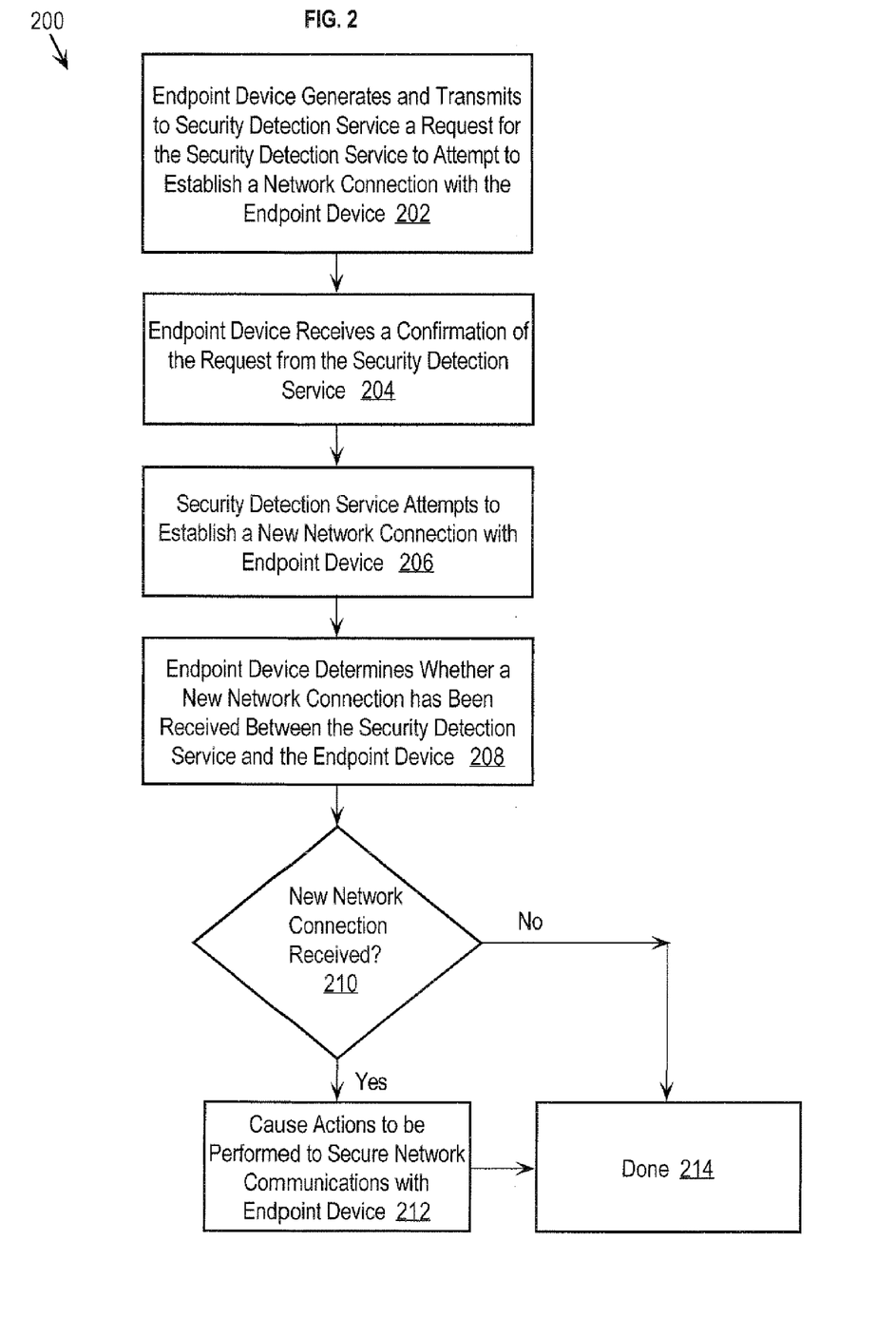
FIG. 2 is a flow diagram that depicts an approach for protecting endpoint devices against unauthorized network connections.

FIG. 2 is a flow diagram 200 that depicts an approach for protecting endpoint devices against unauthorized network connections, according to an embodiment. Reference is also made to elements depicted in FIG. 1. In step 202, an endpoint device initiates a security test by generating and transmitting, to a security detection service, a request for the security detection service to attempt to establish a network connection with the endpoint device. For example, security check service 116 on endpoint device 102 may generate and transmit to security detection service 112, a request for security detection service 112 to attempt to establish a network connection with endpoint device 102. The initiation of the security test may be based upon a wide variety of criteria, depending upon a particular implementation. Example criteria include, without limitation, after an endpoint device is powered up, after receiving an IP address, after receiving a new or renewed IP address attributable to a network change, on a periodic schedule, at random intervals, on demand, or in response to a request from a managed services system, such as a security management system that performs a security check or health assessment. For example, the user interface of an endpoint device may include one or more controls which, when selected, cause the security test to be initiated. This allows a user, such as an administrator, to initiate a security test on demand.

The request that the endpoint device transmits to the security detection service may be in different forms, depending upon a particular implementation, and the approaches described herein are not limited to the request being in a particular form. For example, the request may conform to a standard Web protocol, e.g., HTTP, HTTPS or TCP/IP, and use port 80 to ensure that the request will be permitted. This is helpful in situations where an endpoint device connects through a firewall to access a network, for example, if endpoint device 104 is making the request through firewall 106. This may not be necessary in situations where an endpoint device has a direct network connection, for example, if endpoint device 102 is making the request.

The request that the endpoint device transmits to the security detection service may include different types of information, depending upon a particular implementation, and the approaches described herein are not limited to the request including any particular type of information. Example information included in the request include, without limitation, a local network address of the endpoint device, such as an IP address, a unique identifier of the endpoint device, such as a MAC address, a product identifier of the endpoint device, such as a manufacturer name, model and/or serial number, an email address, telephone number or other information used to enable notification as described in more detail hereinafter, data that identifies ports and protocols open on the endpoint device for accepting connections, authentication data or a digital certificate representing the endpoint device.

In step 204, the endpoint device receives a confirmation of the request from the security detection service. For example, in the situation where the request was an HTTPS request, then the endpoint device may receive an HTTPS response from the security detection service.

In step 206, the security detection service attempts to establish a new network connection with the endpoint device. For example, security detection service 112 may attempt to establish a new TCP connection with endpoint device 102. The security detection service may attempt to establish a new network connection based upon the type of request or information contained in the request. For example, a request may contain data that explicitly indicates the type of request, i.e., that the request is a request for the security detection service to attempt to establish a network connection with the endpoint device. Alternatively, the security detection service may attempt to establish a new network connection based upon receipt of the request under the assumption that all requests sent to the security detection service, e.g., to a particular port, are made to invoke the security test. The security detection service may attempt to establish a new network connection by examining the request received from the endpoint device and using a local IP address of the endpoint device (if it is routable) and/or the network IP address of the endpoint device. If the request identified ports and protocols open on the endpoint device, then the security detection service may attempt to establish a new network connection on each of the port/protocol pairs. For example, the security detection service may attempt to establish a new network connection with the endpoint device on a first port/protocol pair, then on a second port/protocol pair, etc. Alternatively, the security detection service may attempt to establish a new network connection on standard port/protocol pairs used with unsecured endpoint devices, for example 21/FTP, 23/Telnet, 25/SMTP, 80/HTTP and (UDP)161/SNMP. Thus, the attempt by the security detection service to establish a new network connection with the endpoint device may include multiple attempts.

In step 208, the endpoint device determines whether a new network connection has been received between the security detection service and the endpoint device. For example, in the context of TCP, the endpoint device may determine whether an active open (SYN packet) request has been received from the security detection service. Referring to FIG. 1, endpoint device 102 is directly connected to network 114 and would likely receive data indicating receipt of a new network connection between security detection service 112 and endpoint device 102. This assumes that endpoint device 102 is not configured with any network security capability of its own, which is typical of many endpoint devices. In contrast, endpoint device 104 is connected to network 114 via firewall 106 and is generally less likely to determine whether a new network connection has been established between security detection service 112 and endpoint device 104. This assumes that firewall 106 is properly configured, which is not guaranteed. Thus the approach is applicable to protecting endpoint devices that have direct network connectivity, with no network security, as well as endpoint devices that are connected to networks through devices, such as firewalls, that are designed to provide network security, but that may not be currently properly configured (or may have never been configured) to provide network security. The determination of whether a new network connection has been received between the security detection service and the endpoint device may be made based upon time. For example, if a new network connection is received within a specified amount of time or by a particular time, then the endpoint device determines that a new network connection has been received.

If, in step 210, a new network connection has been received between the security detection service and the endpoint device, then in step 212, one or more actions are caused to be performed to secure network communications with the endpoint device. The actions may be performed by the endpoint device, the security detection service, or both the endpoint device and the security detection service. Example actions include, without limitation, one or more of transmitting a notification message to an administrator, changing one or more network security settings on the endpoint device, blocking or disabling one or more ports on the endpoint device, disabling the new network connection, disabling all network connections, or changing the operational state of the endpoint device to, for example, an "offline" or "maintenance shell" state or shutting down the endpoint device. A notification message may include information about the connection(s) that were received, for example, the ports/protocols used for the connection(s). In situations where the security detection service is involved in performing the actions, then the security detection service may use information from the request received from the endpoint device. For example, the security detection service may transmit a notification message using an email address, telephone number or other information contained in the request. The security detection service may use information contained in the request, such as a digital certificate representing the endpoint device, to perform the notification. If the security detection service is part of a managed services system in which the endpoint device participates, such as a security management system, then the security detection service may perform a notification through that system. As another example, the security detection service may use information contained in the request, e.g., a MAC address, serial number, authentication data, or other information, to notify a manufacturer or a third party, or to query a manufacturer database to obtain contact information for sending the notification.

Once the actions are performed in step 212, or if in step 210, the endpoint device determines that a new network connection has not been received between the security detection service and the endpoint device, then the process is complete in step 214.

Figure 3:
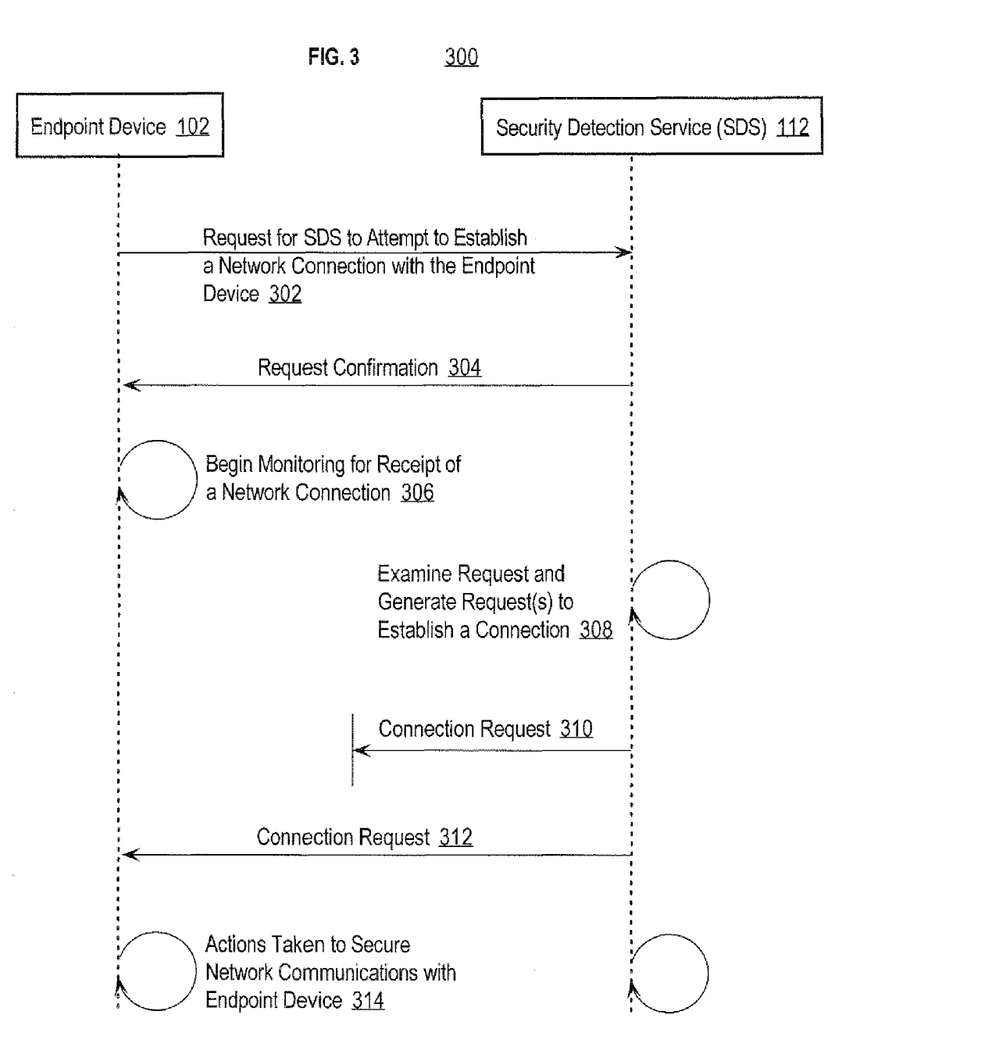
FIG. 3 is a message ladder diagram that depicts example communications between endpoint device and security detection service (SDS) during the process of protecting endpoint device.

FIG. 3 is a message ladder diagram 300 that depicts example communications between endpoint device 102 and security detection service (SDS) 112 during the process of protecting endpoint device 102, according to an embodiment. In step 302, endpoint device 102 initiates a security test by generating and transmitting, to SDS 112, a request for SDS 112 to attempt to establish a network connection with endpoint device 102. In step 304, SDS 112 generates and transmits a request confirmation to endpoint device 102.

In step 306, endpoint device 102 begins monitoring for receipt of any new network connections from SDS 112. For example, security check service 116 may monitor certain open ports on endpoint device 102. The monitoring may be performed at specified times or at intervals that may vary, depending upon a particular implementation.

In step 308, SDS 112 processes the original request from endpoint device 102 and generates one or more requests to establish a new network connection with endpoint device 102. As previously described, this may include SDS 112 examining information contained in the request, for example, network address information, open port and protocols on endpoint device 102, etc. In step 310, SDS 112 transmits a request to establish a new network connection between SDS 112 and endpoint device 102, but the request is not received by endpoint device 102. This may occur, for example, if the request is blocked by a firewall or other network element. In step 310, SDS 112 transmits a request to establish a new network connection between SDS 112 and endpoint device 102 and the request is received by endpoint device 102.

In step 314, in response to detecting that a new network connection has been received between SDS 112 and endpoint device 102 by receipt of the request from SDS 112, then one or more actions are performed to secure network communications for endpoint device 102. The actions may be performed by endpoint device 102, SDS 112, or both endpoint device 102 and SDS 112. If a new network connection has not been received between SDS 112 and endpoint device 102 within a specified time, or by a specified time, then a determination is made that the current network security provisions are sufficient to protect endpoint device 102 and the test is completed.

IV. Other Security Issues

As previously described herein, the security check services 116, 118 operate in conjunction with security detection service 112 to perform a test to determine whether endpoint devices 102, 104 are vulnerable to network attacks and if so, take corrective action to improve the network security of endpoint devices 102, 104. Security detection service 112 is configured to receive and acknowledge requests from endpoint devices to perform a security check by attempting to establish a new network connection between security detection service 112 and the endpoint devices. There may be situations where the security detection service 112 could be used in a malicious manner, for example, to make denial of service attacks on Web servers. For example, a malicious third party could send a security check request to security detection service 112 and spoof the information in the request to cause security detection service 112 to attempt to establish new network connections with the target Web server. According to one embodiment, authentication may be used to verify that the entity requesting the security check is authorized to use the security detection service 112. This may be implemented in a wide variety of ways, depending upon a particular implementation, and the approaches described herein are not limited to any particular method of authenticating requestors. For example, security detection service 112 may be configured with a list of authorized endpoint devices and the list may be managed by network administrator personnel. Alternatively, security detection service 112 may access a database of authorized endpoint devices. This may include, for example, determining whether a network address or other identifying information, such as a MAC address, of a requesting entity is on the list of authorized devices. As another example, security check services 116, 118 may be configured to include in the request specified data that is known by security detection service 112 to confirm that endpoint devices 102, 104 are authorized to use the security detection service 112. Yet another example is for security detection service 112 to authenticate a request for a security check using a digital certificate of the endpoint device, for example, by determining whether a digital certificate is valid.

V. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
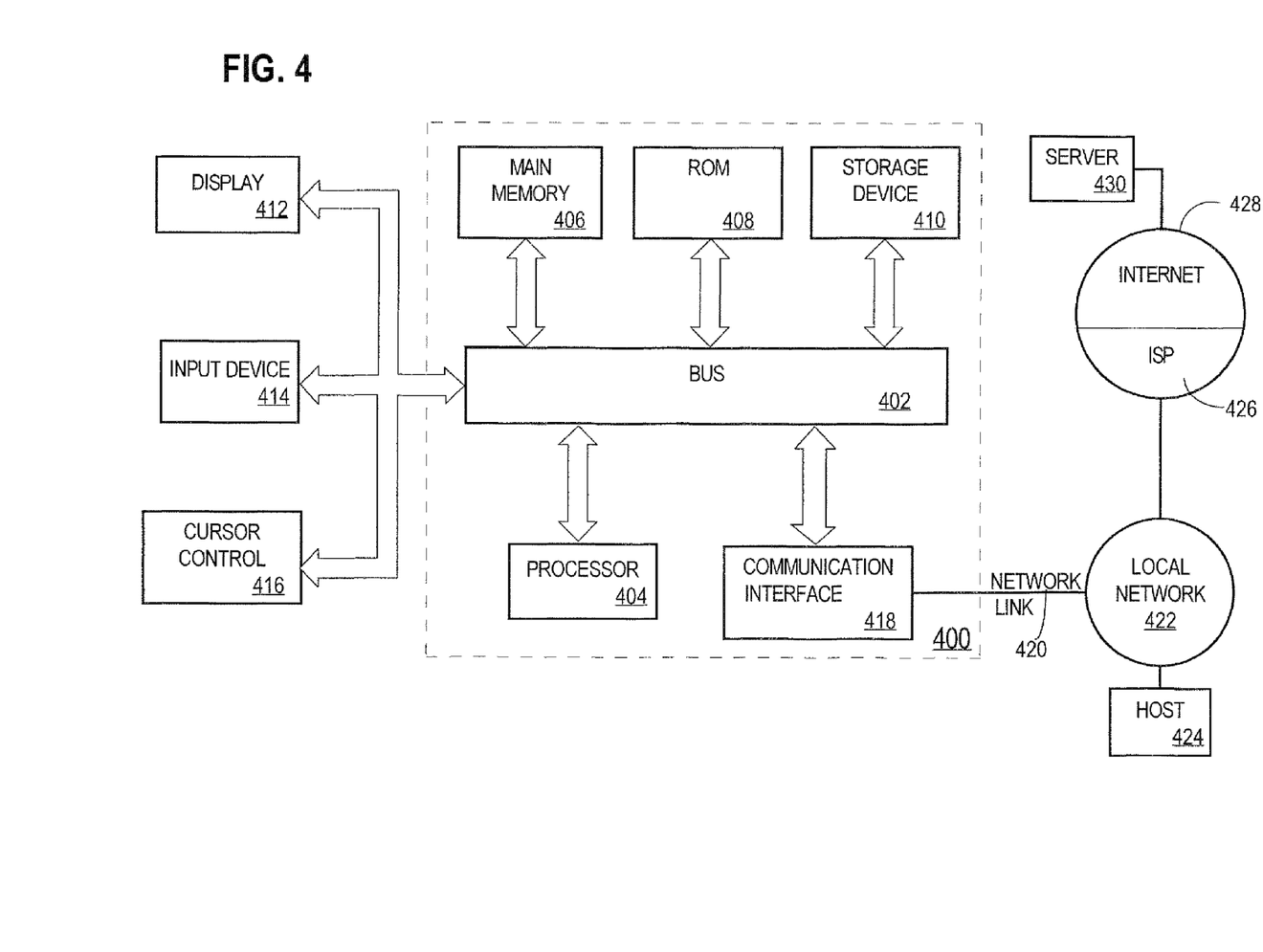
FIG. 4 is a block diagram that depicts a computer system upon which an embodiment may be implemented.

For example, FIG. 4 is a block diagram that depicts a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more computer-readable storage media storing instructions which, when processed by one or more processors, cause:
    an endpoint device transmitting to a security detection service, over one or more communications networks, a request for the security detection service to attempt to establish a network connection with the endpoint device including the security detection service transmitting a connection request to the endpoint device, wherein the request transmitted by the endpoint device to the security detection service for the security detection service to attempt to establish a network connection with the endpoint device including the security detection service transmitting a connection request to the endpoint device includes data that identifies one or more ports and protocols open on the endpoint device, and wherein the security detection service transmits a connection request to the endpoint device in response to the request from the endpoint device for the security detection service to attempt to establish a network connection with the endpoint device;
    the endpoint device receiving, from the security detection service over the one or more communications networks, a response to the request for the security detection service to attempt to establish a network connection with the endpoint device;
    the endpoint device determining whether a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device; and
    in response to the endpoint device determining a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device, then causing one or more actions to be performed to secure network communications with the endpoint device.

2. The one or more computer-readable storage media of claim 1, wherein the endpoint device determining whether a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device includes the endpoint device determining whether a new network connection has been received between the security detection service and the endpoint device either within a specified amount of time or by a specified time.

3. The one or more computer-readable storage media of claim 1, wherein:
    the request transmitted by the endpoint device for the security detection service to attempt to establish a network connection with the endpoint device including the security detection service transmitting a connection request to the endpoint device includes data that indicates a network address of the endpoint device, and
    the security detection service attempts to establish a new network connection between the security detection service and the endpoint device using the network address of the endpoint device.

4. The one or more computer-readable storage media of claim 1, wherein the endpoint device transmits the request for the security detection service to attempt to establish a network connection with the endpoint device including the security detection service transmitting a connection request to the endpoint device in response to one or more of a power up of the endpoint device, the endpoint device receiving a new or renewed network address, expiration of a specified amount of time, in response to expiration of a random interval, in response to a request made via a user interface of the endpoint device, or in response to a request from a managed services system.

5. The one or more computer-readable storage media of claim 1, wherein causing one or more actions to be performed to secure network communications with the endpoint device include one or more of transmitting a notification message to an administrator, changing one or more network security settings on the endpoint device, blocking or disabling one or more ports on the endpoint device, disabling the new network connection, disabling all network connections, or changing the operational state of the endpoint device.

6. The one or more computer-readable storage media of claim 1, wherein:
    the request transmitted by the endpoint device for the security detection service to attempt to establish a network connection with the endpoint device including the security detection service transmitting a connection request to the endpoint device includes identification data that identifies the endpoint device, the security detection service examines the request transmitted by the endpoint device for the security detection service to attempt to establish a network connection with the endpoint device including the security detection service transmitting a connection request to the endpoint device to identify the identification data that identifies the endpoint device, and the one or more actions to be performed to secure network communications with the endpoint device include the security detection service generating and transmitting, based upon the identification data, a notification that indicates that an attempt has been made to establish a network connection between the security detection service and the endpoint device.

7. An apparatus comprising:

one or more processors; and one or more storage media storing instructions which, when processed by the one or more processors, cause:

an endpoint device transmitting to a security detection service, over one or more communications networks, a request for the security detection service to attempt to establish a network connection with the endpoint device including the security detection service transmitting a connection request to the endpoint device, wherein the request transmitted by the endpoint device to the security detection service for the security detection service to attempt to establish a network connection with the endpoint device including the security detection service transmitting a connection request to the endpoint device includes data that identifies one or more ports and protocols open on the endpoint device, and wherein the security detection service transmits a connection request to the endpoint device in response to the request from the endpoint device for the security detection service to attempt to establish a network connection with the endpoint device;

the endpoint device receiving, from the security detection service over the one or more communications networks, a response to the request for the security detection service to attempt to establish a network connection with the endpoint device;

the endpoint device determining whether a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device; and in response to the endpoint device determining a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device, then causing one or more actions to be performed to secure network communications with the endpoint device.

8. The apparatus of claim 7, wherein the endpoint device determining whether a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device includes the endpoint device determining whether a new network connection has been received between the security detection service and the endpoint device either within a specified amount of time or by a specified time.

9. The apparatus of claim 7, wherein:

the request transmitted by the endpoint device for the security detection service to attempt to establish a network connection with the endpoint device including the security detection service transmitting a connection request to the endpoint device includes data that indicates a network address of the endpoint device, and the security detection service attempts to establish a new network connection between the security detection service and the endpoint device using the network address of the endpoint device.

10. The apparatus of claim 7, wherein the endpoint device transmits the request for the security detection service to attempt to establish a network connection with the endpoint device including the security detection service transmitting a connection request to the endpoint device in response to one or more of a power up of the endpoint device, the endpoint device receiving a new or renewed network address, expiration of a specified amount of time, in response to expiration of a random interval, in response to a request made via a user interface of the endpoint device, or in response to a request from a managed services system.

11. The apparatus of claim 7, wherein causing one or more actions to be performed to secure network communications with the endpoint device include one or more of transmitting a notification message to an administrator, changing one or more network security settings on the endpoint device, blocking or disabling one or more ports on the endpoint device, disabling the new network connection, disabling all network connections, or changing the operational state of the endpoint device.

12. The apparatus of claim 7, wherein:

the request transmitted by the endpoint device for the security detection service to attempt to establish a network connection with the endpoint device including the security detection service transmitting a connection request to the endpoint device includes identification data that identifies the endpoint device, the security detection service examines the request transmitted by the endpoint device for the security detection service to attempt to establish a network connection with the endpoint device including the security detection service transmitting a connection request to the endpoint device to identify the identification data that identifies the endpoint device, and the one or more actions to be performed to secure network communications with the endpoint device include the security detection service generating and transmitting, based upon the identification data, a notification that indicates that an attempt has been made to establish a network connection between the security detection service and the endpoint device.

13. A computer-implemented method comprising:

an endpoint device transmitting to a security detection service, over one or more communications networks, a request for the security detection service to attempt to establish a network connection with the endpoint device including the security detection service transmitting a connection request to the endpoint device, wherein the request transmitted by the endpoint device to the security detection service for the security detection service to attempt to establish a network connection with the endpoint device including the security detection service transmitting a connection request to the endpoint device includes data that identifies one or more ports and protocols open on the endpoint device, and wherein the security detection service transmits a connection request to the endpoint device in response to the request from the endpoint device for the security detection service to attempt to establish a network connection with the endpoint device;

the endpoint device receiving, from the security detection service over the one or more communications networks, a response to the request for the security detection service to attempt to establish a network connection with the endpoint device;

the endpoint device determining whether a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device; and in response to the endpoint device determining a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device, then causing one or more actions to be performed to secure network communications with the endpoint device.

14. The computer-implemented method of claim 13, wherein the endpoint device determining whether a new network connection has been received between the security detection service and the endpoint device using the one or more ports and protocols open on the endpoint device that were specified by the endpoint device in the request transmitted by the endpoint device to the security detection service for the security detection service to attempt to establish a network connection with the endpoint device including the security detection service transmitting a connection request to the endpoint device includes the endpoint device determining whether a new network connection has been established between the security detection service and the endpoint device either within a specified amount of time or by a specified time.

15. The computer-implemented method of claim 13, wherein causing one or more actions to be performed to secure network communications with the endpoint device include one or more of transmitting a notification message to an administrator, changing one or more network security settings on the endpoint device, blocking or disabling one or more ports on the endpoint device, disabling the new network connection, disabling all network connections, or changing the operational state of the endpoint device.

* * * * *